US012045258B2

(12) United States Patent
Desai et al.

(10) Patent No.: US 12,045,258 B2
(45) Date of Patent: Jul. 23, 2024

(54) SYSTEM AND METHOD OF PROVIDING CONDITIONAL COPYING OF DATA

(71) Applicant: Microsoft Technology Licensing, LLC, Redmond, WA (US)

(72) Inventors: Mukti Nikhil Desai, Seattle, WA (US); Mohit Tandon, Bellevue, WA (US); Christopher Walker Barrett, Seattle, WA (US); Shalini Balasubramonian, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 17/711,611

(22) Filed: Apr. 1, 2022

(65) Prior Publication Data

US 2023/0315756 A1 Oct. 5, 2023

(51) Int. Cl.
*G06F 16/27* (2019.01)
*G06F 11/07* (2006.01)

(52) U.S. Cl.
CPC ........ *G06F 16/275* (2019.01); *G06F 11/0751* (2013.01); *G06F 11/0766* (2013.01)

(58) Field of Classification Search
CPC ............... G06F 16/275; G06F 11/0751; G06F 11/0766; G06F 16/27; G06F 3/065
(Continued)

(56) References Cited

U.S. PATENT DOCUMENTS 5,822,773 A * 10/1998 Pritchard .............. G06F 3/0679 711/162
7,769,722 B1   8/2010 Bergant et al.
(Continued)

OTHER PUBLICATIONS

"International Search Report and Written Opinion Issued in PCT Application No. PCT/US23/010900", dated Mar. 31, 2023, 12 Pages.
"Active / Active architecture", Retrieved From: https://docs.cloudera.com/runtime/7.2.10/srm-overview/topics/srm-active-active-arch.html, Retrieved on: Feb. 14, 2022, 1 Page.
Fan, et al., "Business Continuity and Disaster Recovery for Azure Logic Apps", Retrieved From: https://docs.microsoft.com/en-us/azure/logic-apps/business-continuity-disaster-recovery-guidance, Feb. 25, 2022, 17 Pages.
(Continued)

*Primary Examiner* — Phong H Nguyen
(74) *Attorney, Agent, or Firm* — NovoTechIP International PLLC

(57) ABSTRACT

A method for performing conditional copying of a data object in a data environment to prevent a copying operation failure includes receiving a request to copy the data object to a destination source, the request including an identification of a first source data object, a second source data object and indication of an order of preference between the first data object and the second data object for copying the data object; determining based on the order that data object should be copied from the first source data object; examining a first source indicator to determine if the first source data object is available for copying; based on the determination, copying the data object from the first source data object to the destination source, when the first source data object is available and copying the copying the data object from the second source data object to the destination source, when the first source data object is not available; and creating an indication of successful copying of the data object to the destination source. The first source data object and the second source data object both contain the data object and the first source data object and the second source data object are active-active data objects that are replicas of each other.

20 Claims, 6 Drawing Sheets

(58) Field of Classification Search
USPC .............................. 707/610, 615, 624, 660
See application file for complete search history.

(56) References Cited

U.S. PATENT DOCUMENTS

| | | | |
|---|---|---|---|
| 8,229,954 | B2 | 7/2012 | Kottomtharayil et al. |
| 8,572,023 | B2 | 10/2013 | Resende, Jr. et al. |
| 8,819,232 | B2 | 8/2014 | Bellessort et al. |
| 9,503,530 | B1* | 11/2016 | Niedzielski ............. H04L 67/51 |
| 9,779,127 | B2 | 10/2017 | Sardina et al. |
| 2002/0198953 | A1* | 12/2002 | O'Rourke ........... H04L 67/5682 |
| | | | 709/213 |
| 2005/0198450 | A1* | 9/2005 | Corrado ................ G06F 3/0613 |
| | | | 711/114 |
| 2014/0281257 | A1* | 9/2014 | Hochberg ............... G06F 3/065 |
| | | | 711/135 |
| 2016/0042097 | A1* | 2/2016 | Briggs .................... G06F 30/00 |
| | | | 703/1 |
| 2016/0087906 | A1 | 3/2016 | Ohno |
| 2021/0232602 | A1 | 7/2021 | Reetz-lamour et al. |
| 2023/0133533 | A1* | 5/2023 | George ............... G06F 11/1464 |
| | | | 707/646 |

OTHER PUBLICATIONS

Terry, Slattery, "Active-Active Data Centers Key to High-Availability Application Resilience", Retrieved From: https://www.techtarget.com/searchnetworking/tip/Active-active-data-centers-key-to-high-availability-application-resilience, Aug. 2018, 4 Pages.

* cited by examiner

SYSTEM AND METHOD OF PROVIDING CONDITIONAL COPYING OF DATA

BACKGROUND

In recent years, data has become an important aspect of various software programs' feature development, reliability, tracking, product production and many more fields. The amount of data collected, stored, utilized and/or analyzed in these fields is often significantly large and may include many different datasets. To create a dataset, a variety of complex transformations and validations of incoming raw data streams may be performed. The data streams are often provided by other datasets. As such, a dataset may depend on multiple other datasets. As the number of datasets and dependencies between them increases, management of data becomes more complex.

One of the complexities of managing a large data storage environment is handling copying of datasets from one location to another. In data storage environments where one or more datasets are frequently generated or regenerated (e.g., once a day or once a week), a dataset may not be ready for copying when a copy request is received. For example, the dataset may be in the process of being generated and as a result may be unavailable for copying when the copy request is received. When the dataset is not available, the copy request may result in a failure. This may require human intervention to determine if the dataset is available for copying elsewhere in the data storage environment and/or determining an amount of time required for generating the dataset. Engaging a person to analyze and address the issue is, however, time consuming and inefficient. Furthermore, a data copy request is often time sensitive. The amount of time required to review failed copy attempts and address them often results is unfulfilled service-level agreements (SLA).

Hence, there is a need for improved systems and methods for providing conditional copy of data.

SUMMARY

In one general aspect, the instant disclosure describes a data processing system having a processor, and a memory in communication with the processor where the memory comprises executable instructions that, when executed by the processor, cause the data processing system to perform multiple functions. The functions may include receiving a request to copy a data object in a data environment to a destination source, the request including an identification of a first source data object, a second source data object and indication of an order of preference between the first data object and the second data object for copying the data object, the first source data object and the second source data object containing the data object and the first source data object and the second source data object being active-active data objects that are replicas of each other; determining based on the order that the data object should be copied from the first source data object, when the first source data object is available; examining a first source indicator to determine if the first source data object is available for copying, and if so, copying the data object from the first source data object to the destination source; upon determining that the first source data object is not available for copying, determining whether the second source data object is available for copying, and, if so, copying the data object from the second source data object to the destination source; and upon copying the data object to the destination source, creating an indication of successful copying of the data object to the destination source.

In yet another general aspect, the instant disclosure describes a method for providing conditional copying of a data object in a data environment to prevent a copy operation failure. The method includes the steps of receiving a request to copy the data object to a destination source, the request including an identification of a first source data object, a second source data object and indication of an order of preference between the first data object and the second data object for copying the data object; determining based on the order that data object should be copied from the first source data object; examining a first source indicator to determine if the first source data object is available for copying; based on the determination, copying the data object from the first source data object to the destination source, when the first source data object is available and copying the copying the data object from the second source data object to the destination source, when the first source data object is not available; and creating an indication of successful copying of the data object to the destination source. The first source data object and the second source data object both contain the data object and the first source data object and the second source data object are active-active data objects that are replicas of each other.

In a further general aspect, the instant disclosure describes a non-transitory computer readable medium on which are stored instructions that when executed cause a programmable device to perform functions of receiving a request to copy a data object in a data environment to a destination source, the request including an identification of a first source data object, a second source data object and indication of an order of preference between the first data object and the second data object for copying the data object, the first source data object and the second source data object containing the data object and the first source data object and the second source data object being active-active data objects that are replicas of each other; determining based on the order that the data object should be copied from the first source data object, when the first source data object is available; examining a first source indicator to determine if the first source data object is available for copying, and if so, copying the data object from the first source data object to the destination source; upon determining that the first source data object is not available for copying, determining whether the second source data object is available for copying, and, if so, copying the data object from the second source data object to the destination source; and upon copying the data object to the destination source, creating an indication of successful copying of the data object to the destination source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference

DETAILED DESCRIPTION

Figure 1:
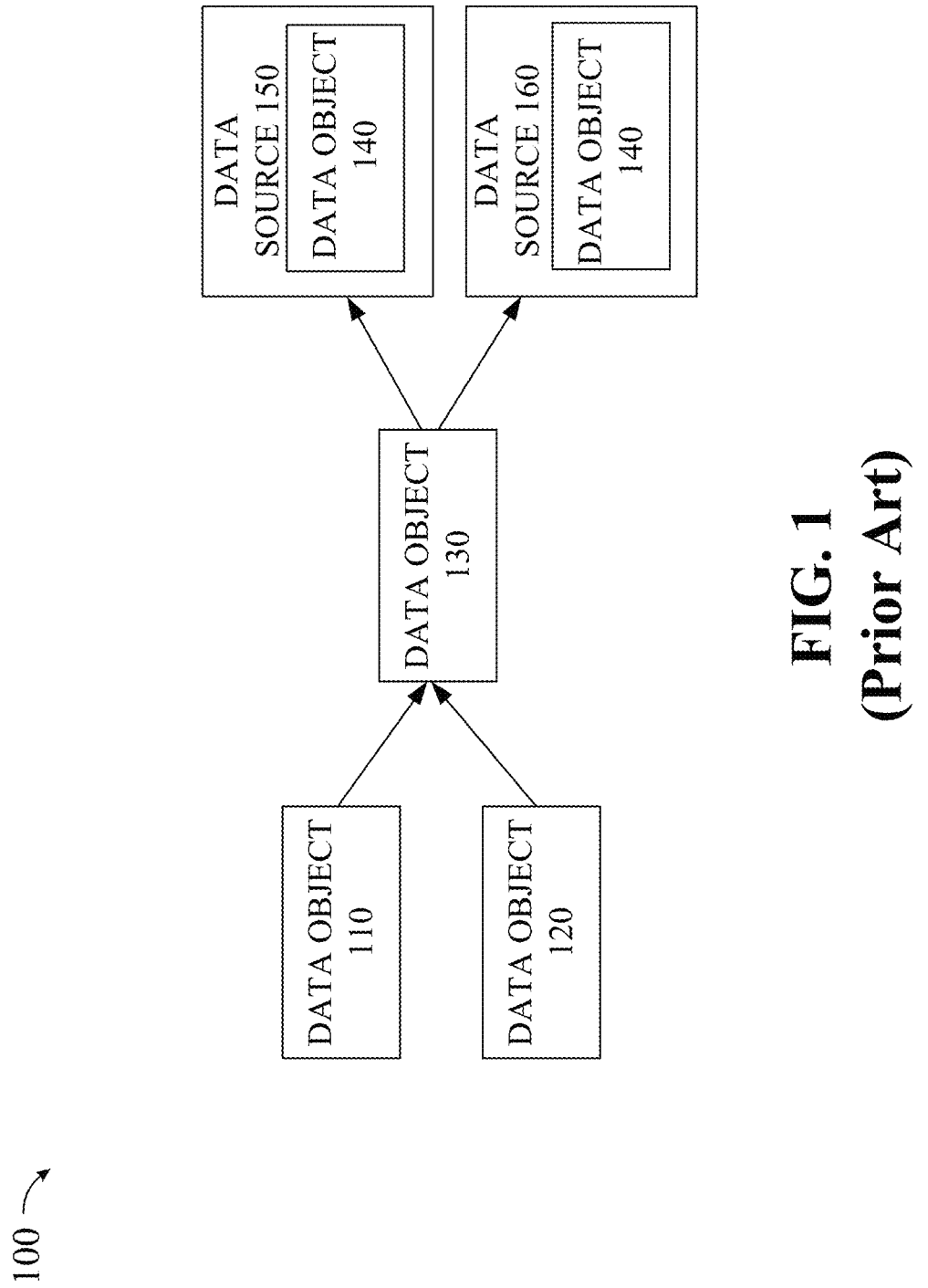
FIG. 1 depicts an example data environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Data environments often include many different types of data objects (e.g., datasets) that are generated at different times and with different frequencies. Some data objects in data environments depend on other data objects. As a result, the timing of their generation may depend on completion of upstream data objects. Many data objects in a data environment are consumed by internal and/or external customers. For example, a data object may be used to generate another data object or may be provided to an external customer for use. Use of a data object may require copying of the data object from a source on which it is stored to a destination source. As a result, data environments often receive copy requests for copying of various data objects. The copy request is often time sensitive or subject to SLAs. For example, an external customer may have an agreement stating that their data requests are fulfilled within 24 hours. In a data environment where a data object's readiness depends on upstream data objects or other teams, fulfilling the copy request within the allotted time may be difficult. This is particularly true when the data object is not available, thus requiring human intervention to determine the reasons behind unavailability or scheduling the copying process for when the data becomes available. This can be a time consuming and error prone process, as it may involve teamwork from many different teams. Thus, there exists a technical problem of inability of current systems to automatically and efficiently handle data copying requests.

To prevent failure of data copying operations, some data environments provide redundancy by providing an active-active data structure in which one or more data objects are provided in two or more sources that are both active, with each source being comprehensive and available on its own. This sometimes results in an upstream team complying with a customer request (e.g., SLA) by making the data object available in one of two sources. However, if the copy request for the data object points to the source on which the data object is not yet available as the data source, the copy request will fail. This may result in the need for human intervention and/or an unfulfilled SLA even though the data is available in a different source.

To address this some data environments provide data copy redundancy be copying the data from two sources in active-active data structures. This involves copying the data object from two different sources. While this process reduces the chances of failure, it significantly increases (e.g., doubles) the use of computer resources such as memory, processing and bandwidth. Furthermore, such a process requires code and storage entity (e.g., cloud entity) duplication which makes managing the copying process very inefficient, thus resulting in inefficient use and management of computer systems and data environments. Thus, there exists a technical problem of inability of current systems to manage data copying operations in a data environment in an efficient, reliable and accurate manner which is time and resource efficient and ensures compliance with customer needs.

To address these technical problems and more, in an example, this description provides a technical solution of providing a conditional data copying process that uses a primary data source, a secondary data source and data indicators to manage conditional data copying into a destination data source from one of two data sources. This may be achieved by providing a template for enabling conditional data copying functionality. The template may be involved by utilizing a meta configuration which can contain the identity of the primary data source, secondary data and the destination data source. The meta configuration may be a file that contains the required information. In some implementations, the template enables submission of an explicit order in which the copying process should be carried out. For example, the order may specify a primary data source from which copying should first be attempted and a secondary data source from which copying should be attempted, if the data is not available in the primary source. In some implementations, the user submitting the copy request provides the identification of the primary data source, secondary data source, and destination data source, as well as a primary source indicator, a secondary source indicator and a destination indicator. The conditional copying process may then examine the existence of the data object in the primary data source. Upon determining that the data object exists in the primary data source, the copying process may proceed to copy the data object from the primary data source to the destination data source. When it is determined, however, that the data object is unavailable in the primary data source, the copying process may examine secondary data source and copy the data object from the secondary data source when available. In this manner, the technical solution enables automatic use of a secondary data source for copying purposes when a primary data source is not available, thus increasing efficiency, reducing the need for human intervention and eliminating the need for duplicate copying efforts.

As will be understood by persons of skill in the art upon reading this disclosure, benefits and advantages provided by such technical solutions can include, but are not limited to, a solution to the technical problems of having inefficient, redundant, time-consuming, and human labor-intensive copying of data objects in data environments. Technical solutions and implementations provided herein optimize and improve an active-active data structure by enabling automatic use of conditional copying from one of multiple data sources, thus minimizing manual input, reducing the chance of failure of copy operations, and reducing the possibility of encountering unfulfilled customer requests (e.g., SLA). As a result, the technical solution improves the operation and efficiency of computer systems. Furthermore, the technical solutions present identified procedures for handling computer issues in an easily accessible and understandable graphical user interfaces. The technical effects at least include (1) improving the efficiency of computer systems by eliminating the need for duplicate copying of data objects from two or more data sources, thus significantly reducing memory, processing and bandwidth usage; and (2) improving the efficiency of data copying operations by enabling automatic copying from a secondary data source when a primary data source is unavailable.

As used herein, the term "data object" may refer to any data structure that can be copied from one location to another. Examples of data objects include, datasets, databases, electronic files and the like. Moreover, the term "dependent" may be used to refer to a dataset or system which receives and uses a data stream from another dataset or system to generate its own data stream or output. Furthermore, as used herein, the term "downstream" may be used to refer to a data object that is dependent on another data object. The term "upstream," on the other hand, may refer to a data object on which another data object depends.

FIG. 1 depicts an example simplified data environment 100 upon which aspects of this disclosure may be implemented. The environment 100 is a simplified environment which includes four different data objects identified as data object 110, data object 120, data object 130 and data object 140. As illustrated, data object 130 in the environment 100 depends on data objects 110 and 120. This means that to generate data object 130, data may need to be received from both data objects 110 and 120. Thus, data object 130 may not be produced until both data objects 110 and 120 have been generated, and data object 140 may not be generated until data object 130 is completed. Once a data object is generated, it may be supplied to multiple different sources. That is because in complex data environments, a data object may be used for a variety of different computing tasks and may be supplied to internal or external users. Often these tasks are managed by different engineering groups. As a result, a variety of different engineering teams may be responsible for different parts of the data environment. While different tasks and data objects may be assigned to different groups, however, it is common for data from a data object managed by one group to be consumed by a data object managed by a different group. This results in interdependency of data among different engineering teams and/or external/internal teams.

In an example, data object 140 may be supplied to two different consumers and/or storage locations as data source 150 and data source 160. This may occur at different times. For example, a team responsible for generating data object 140 may ensure that data object 140 is generated and supplied as data source 150 to ensure compliance with a request (e.g., an SLA requiring generation of the data by a given time). The same or a different team may be responsible for providing the data object 140 as data source 160. However, because the timing requirements of data source 160 are not as urgent as those of data source 150, data object 140 may be provided as data source 160 at a later time/date. Thus, there may be a time period during which data object 140 is available as data source 150 and unavailable as data source 160. If a copying attempt for copying the data object 140 is made from the data source 160 during this time period, the copying attempt will fail. This may result in an unfulfilled customer request and/or the need for human intervention to identify another source from which data object 140 is available (e.g., data source 150). To avoid this technical problem, the instant disclosure provides a mechanism for enabling conditional copying of data from two or more data sources, as further discussed below.

Figure 2:
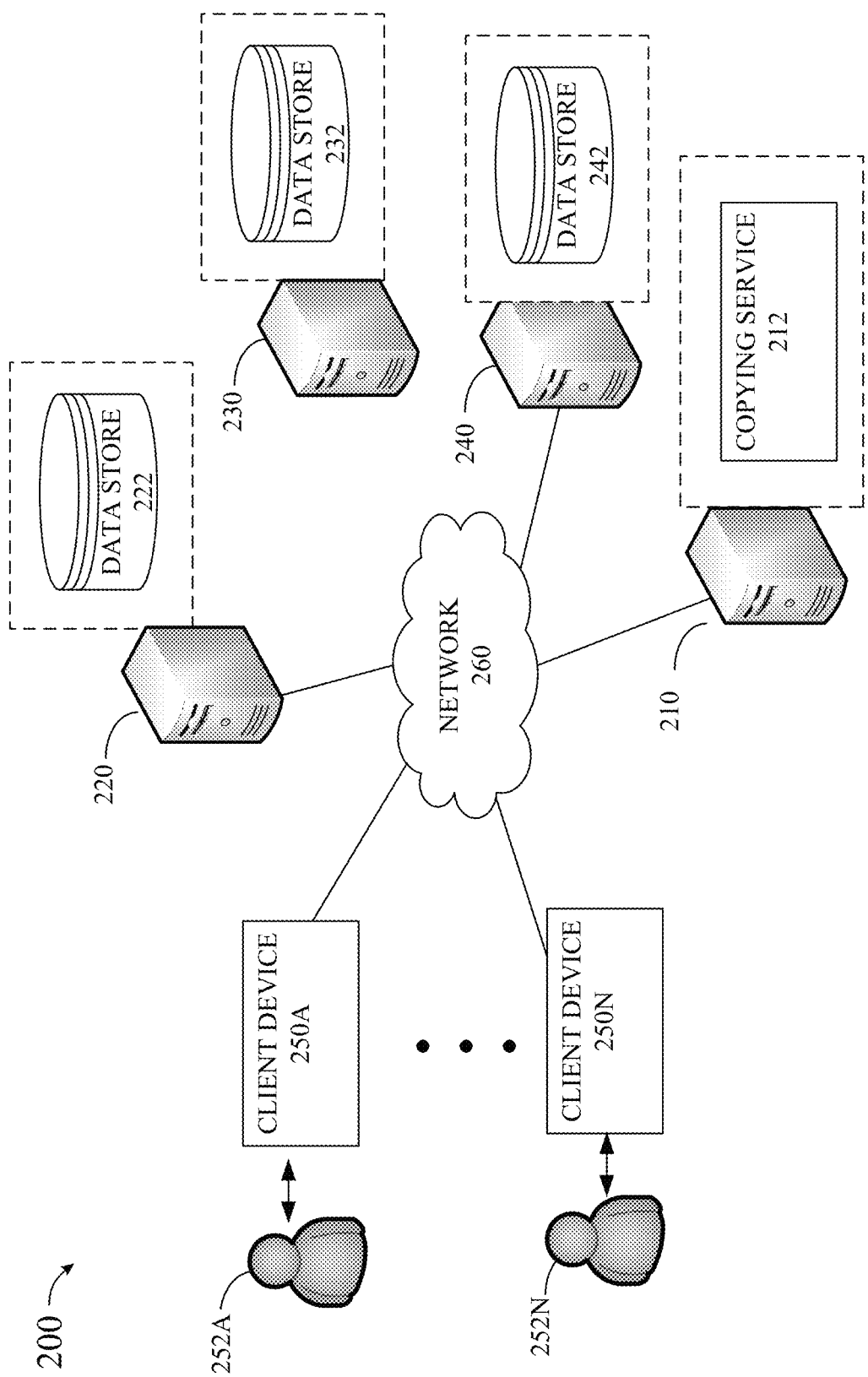
FIG. 2 depicts a system upon which aspects of this disclosure may be implemented.

FIG. 2 depicts an example system upon which aspects of this disclosure may be implemented. In different implementations, the system 200 may include a server 210, a storage server 220, a storage server 230 and a storage server 240. The server 210 may include and/or execute a copying service 212. The storage servers 220, 230 and 240 may include a data store 222, data store 232 and data store 242, respectively. Each of the data stores 222, data store 232 and data store 242 may function as a repository in which multiple data objects may be stored. In an example, the data store 222 may function as a repository for a primary source data object, data store 232 may operate as a repository for a secondary source data object and data store may server as a repository for a destination source data object. Each of the servers 210, 220, 230 and 240 may operate as shared resource servers located at an enterprise accessible by various computer client devices such as client devices 250A through 250N. Each of the servers 210, 220, 230 and 240 may also operate as cloud-based servers for offering copying or storage services. Although shown as one server, each of the servers 210, 220, 230 and 240 may represent multiple servers for performing various different operations. For example, the server 210 may include one or more processing servers for performing copying operations. In another example, each of the storage servers 220, 230 and 240 includes or represents multiple storage servers, each having one or more data stores for storing data. Furthermore, although shown as separate servers, two or more of the servers 210, 220, 230 and 240 may be combined into one server. For example, the same storage server may be used to store the primary source data object, secondary source data object and destination source data object.

The copying service 212 offered by the server 410 may provide a mechanism for enabling conditional copying of data in a data environment such as data stored in the data stores 222, 232 and 242. As such, the copying service 212 may be responsible for receiving a conditional copying request and managing the copying process. The copying service may include a template that can be invoked to initiate a conditional copying process. In an example, the copying request is provided via a file (e.g., a JavaScript Object Notation (JSON) file) submitted by a user. The user may be an external or internal customer (e.g., within or outside of the organization that manages the data environment). The file may contain the identity of a template to be invoked for initiating conditional copying. Moreover, the file may include properties that need to be transmitted to the template to initiate conditional copying. The properties may include the identity of the primary source data object, the identity of the primary source indicator, the identity of the secondary source data object, the identity of the secondary source indicator, the identity of the destination source data object, the identity of the destination indicator and the order in which the primary and secondary source data objects should be used for copying.

In some implementations, the copying service 212 is a tool offered to users via which they can submit a request for conditional copying. For example, the copying service 212 may provide a user interface screen via which the user can submit a request for conditional copying in a data environment. Once a request for conditional copying is received, the copying service 212 may determine the order in which the copying process should occur. This may be achieved by simply examining to see which source data object is indicated as being the primary source data object in the copying request. Once the primary source data object is identified, the copying process may begin by determining if the primary source data object is available for copying and proceeding to copy the data from the primary source data object to the destination source data object, when available. When the primary source data object is not available, then the copying service 212 may make use of the secondary source data object to copy the data. In this manner, the copying service 212 enables conditional copy in an appropriate order.

The client devices 250A to 250N may include any stationary or mobile computing devices configured to provide a user interface for interaction with a user 252A to 252N and/or configured to communicate via the network 260. For example, the client devices may include workstations, desktops, laptops, tablets, smart phones, cellular phones, personal data assistants (PDA), printers, scanners, telephone, or any other device that can be used to interact with the users 252A to 252N. The client devices 250A to 250N may be representative of client devices used by internal consumers (e.g., engineering team members) or external consumers of data objects who may submit a request for copying a data object from one source to another. The internal hardware structure of a client device is discussed in greater detail with respect to FIGS. 5 and 6.

Various elements of the system 200 may be connected to each other via the network 260. For example, each of the servers 210, 220, 230 and 240 may be connected to one another via the network 260. Similarly, the client devices 250A through 250N may be connected to the servers 210, 220, 230 and 240 420 via the network 260. The network 260 may be a wired or wireless network or a combination of wired and wireless networks.

Figure 3:
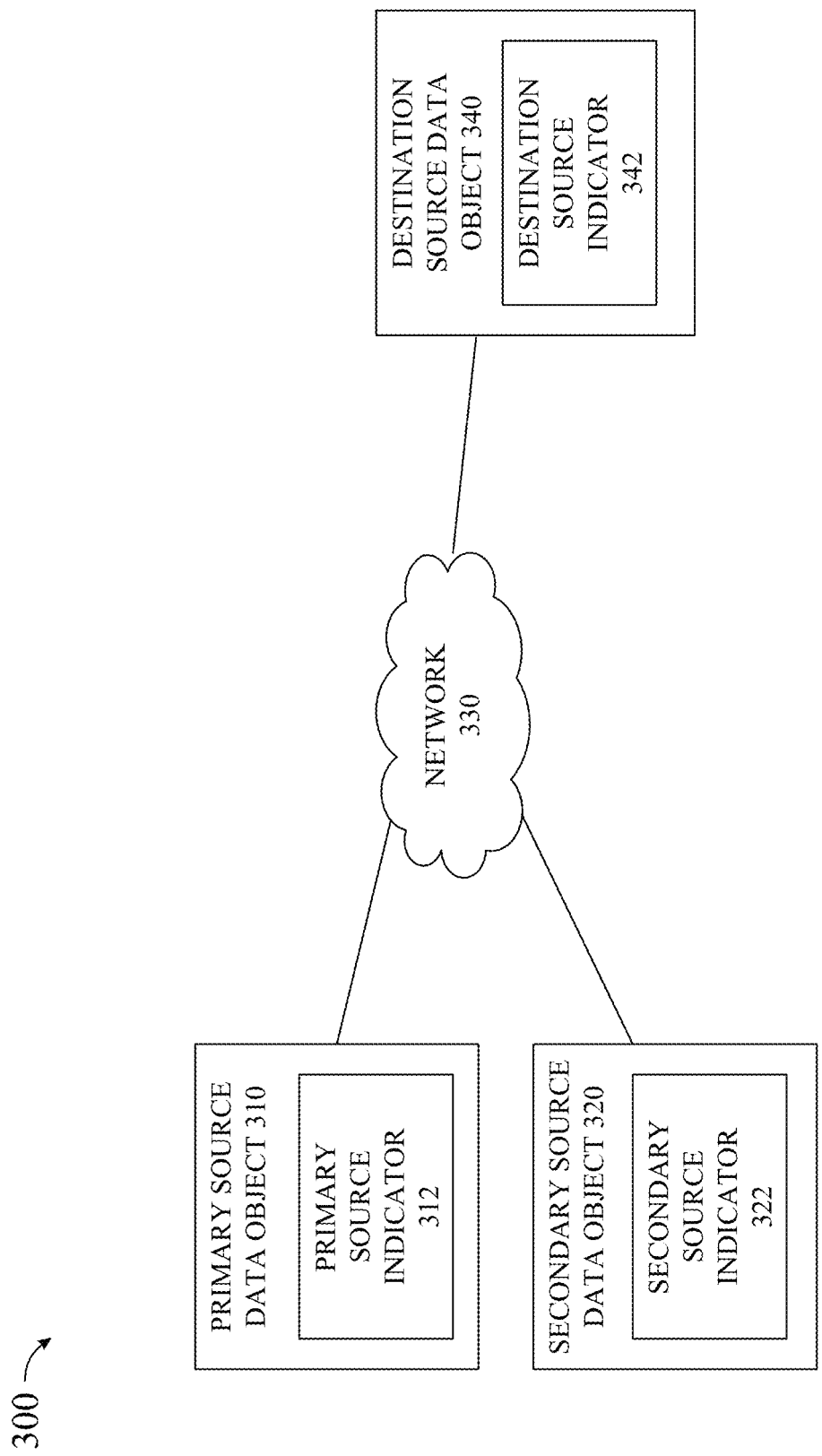
FIG. 3 depicts an example data source architecture upon which aspects of this disclosure may be implemented.

FIG. 3 depicts an example data source architecture 300 upon which aspects of this disclosure may be implemented. The data source architecture 300 includes a primary source data object 310, a secondary source data object 320 and a destination source data object 340. The primary source data object 310 and secondary source data object 320 may represent an active-active data structure where, when available, both data objects are active for use and copying. Data may be copied from the primary source data object 310 or secondary source data object 320 to the destination source data object 340. By providing a mechanism for conditional copying of data from one of two or more copies of the same data object, the technical solution eliminates the need for duplicate copying of the data from multiple data objects, while automatically making use of nay redundancy that is already available in the data environment, thus significantly increasing efficiency of data copying processes.

The primary source data object 310 and secondary source data object 320 may represent two different copies of the same dataset. In some implementations, the two different copies are stored at different locations. When a need for copying the dataset arises, the data can be copied from one of the primary source data object 310 or secondary source data object 320, based on a predetermined order of preference. The order may be explicitly provided by the user who submits the copy request. In other implementations, the order may be automatically determined or may be determined randomly.

The primary source data object 310 may include or be associated with a primary source indicator 312. Similarly, the secondary source data object 320 may include or be associate with secondary source indicator 322 and the destination source data object 340 may include or be associated with a destination source indicator 342. Each of the primary source indicator 312, secondary source indicator 322 and the destination source indicator 342 may be a data object (e.g., an electronic file such as text file) that includes information about the data object. In some implementations, the primary source indicator 312, secondary source indicator 322 and the destination source indicator 342 may include metadata such as the state of the data object. For example, the primary source indicator 312 may contain information on whether the data object has been completed and/or is available for use. In some implementations, one or more of the primary source indicator 312, secondary source indicator 322 and the destination source indicator 342 are generated once their associated data object is generated. In this manner, the presence of the indicator indicates that the data object is complete and available for use. This can be used in the conditional copying process, as discussed in more detail below with regards to FIG. 4.

Figure 4:
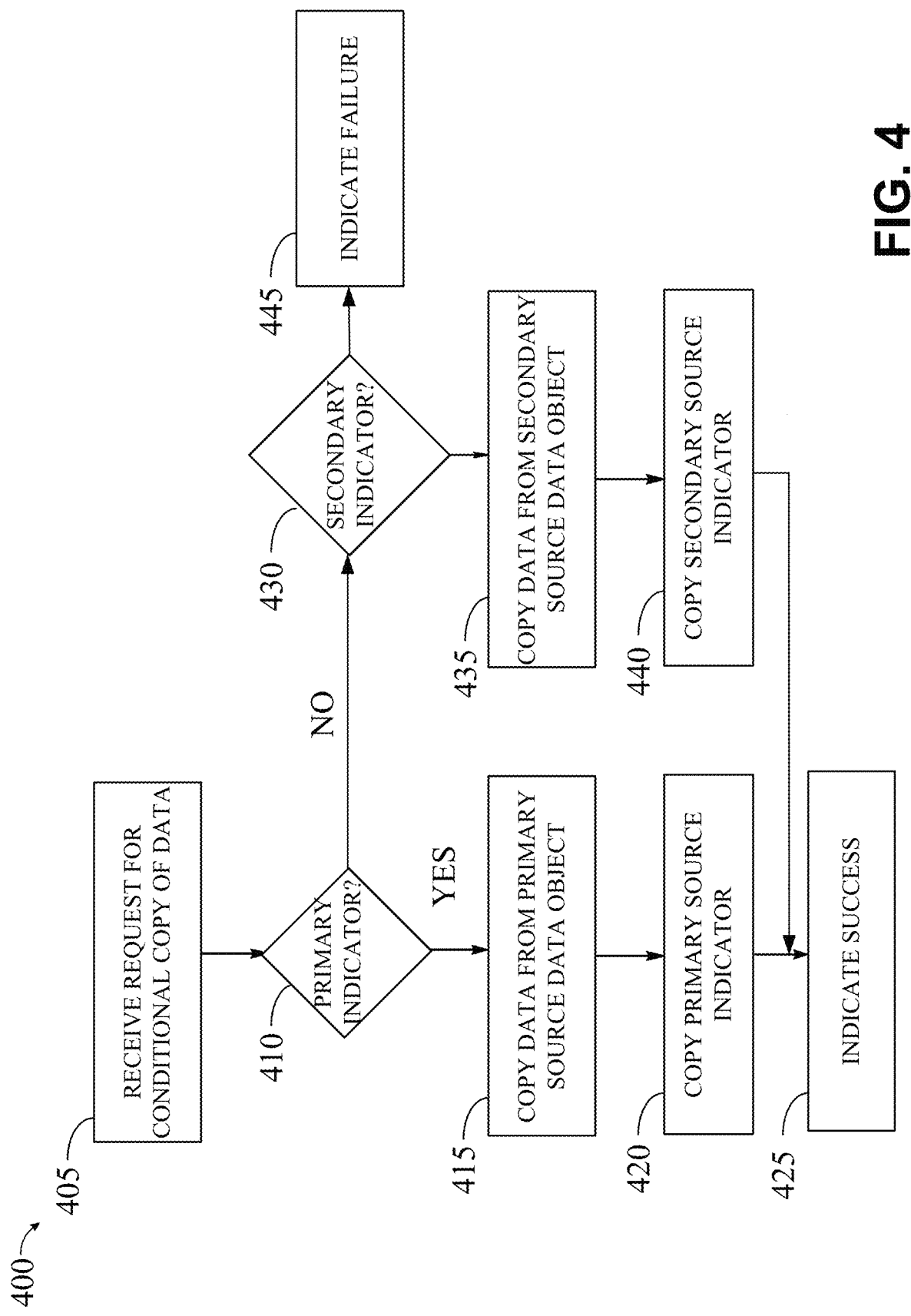
FIG. 4 is a flow diagram showing an example method for automatic restatement of data based on data dependencies.

FIG. 4 is a flow diagram depicting an example method 400 for providing conditional copying of data. In an example, one or more steps of method 400 may be performed by a copying service provided by a server (e.g., server 410 of FIG. 4). The copying service may provide a template for enabling conditional copy functionality. In an example, the template provides a workflow for copying data when at least two sources of data are provided with a preference order.

At 405, the method 400 may begin by receiving a request for conditional copying of data. The request may be received from a user or generated automatically by a computing device. The request may include information about the primary source data object, the secondary source data object, and the destination source data object. Furthermore, the request may include information for identifying each of the indicator files associated with the primary, secondary and destination data objects. By identifying one of the data objects as the primary data object and the other data object as the secondary data object, the request may specify an order based on which copying operation should be attempted. In some implementations, the request may include more than two source data objects. For example, the request may identify a primary source data object, a secondary source data object and third source data object, which may be used when both the primary and secondary source data objects are unavailable.

In an example, the request for conditional copying is transmitted via a JSON file. The file may be created using a Visual Studio code plugin (e.g., meta config artifact) and may refer to the conditional copying template. The following is an example of a simplified conditional copying request file.

```
{
    "$schema": "https://pipelinestudioschema.azuree.net/meta/config.v1.json",
        "templateName": "ConditionalCopy",
        "properties": {
            "pipelineName" : "ABC_Company_ConditionalCopyPipeline",
```

-continued

```
        "primarySource": {
                "name": "PrimarySource",
                "version": 1,
                "type": "BinarySourceV1",
                "wildcardFolderPath":
                "/hourly/company/@{formatDateTime(pipeline( ).parameters.windowStart,'yyyy/MM/
                dd/
                "wildcardFileName": "*.parquet",
                "datasource": "Sales"
        },
        "secondarySource": {
                "name": "SecondarySource",
                "version": 1,
                "type": "BinarySourceV1",
                "wildcardFolderPath":
                "/hourly/company/@{formatDateTime(pipeline( ).parameters.windowStart,'yyyy/MM/
                dd/
                "wildcardFileName": "*.parquet",
                "datasource": "Sales"
        },
        "primarySourceIndicator": {
                "name": "PrimaryIndicatorSource",
                "version": 1,
                "type": "BinarySourceV1",
                "datasource": "Sales"
        },
        "secondarySourceIndicator": {
                "name": "SecondaryIndicatorSource",
                "version": 1,
                "type": "BinarySourceV1",
                "datasource": "Sales"
        },
        "destination": {
                "name": "Destination",
                "version": 1,
                "type": "BinarySinkV1",
                "copyBehavior": "PreserveHierarchy"
        },
        "destinationIndicator": {
                "name": "DestinationIndicator",
                "version": 1,
                "type": "BinaryDestinationV1"
        }
    }
}
```

After receiving the request for conditional copying, method 400 may proceed to determine if the primary indicator identified in the request exists, at 410. This may involve attempting to retrieve the primary indicator file from a location identified in the request (e.g., retrieving metadata). If the primary indicator file is available, then method 400 determines that it exists (yes at 410). This indicates that the primary data object is available for copying. As a result, method 400 proceeds to copy the data from the primary source data object, at 415.

Once the data is copied, method 400 also copies the primary source indicator to the destination source, at 420. In some implementations, copying the source indicator to the destination source may involve copying the primary source indicator to the destination source to generate a destination source indicator and changing the content of the destination source indicator to include information about the destination data object. In an example, copying the primary source indicator to the destination source involves generating a destination indicator for the destination source data object. After both the primary source data object and the primary source indicator have been copied, method 400 may indicate success, at 425, before ending. Indicating success may involve creating a log entry in a log file that stores information about the copying process. The information in the log file may be accessible to one or more engineering team members and/or the user who requested the copying operation. In this manner, one or more users may be able to check the status of the copying operation and/or determine its success or failure. In an example, the log file is a text file and the log entries are text entries that contain one or more characters (e.g., words or phrases) that indicate success, failure, and/or a time/date when an action took place.

When it is determined at 410 that the primary source indicator is not available (no at 410), method 400 may proceed to determine if the secondary source indictor is available, at 430. If the secondary source indicator is available (yes at 430), method 400 may proceed to copying the data from the secondary source indicator, at 435, before moving to copy the secondary source indicator, at 440. Once both the secondary source data object and the secondary source indicator have been copied, method 400 may indicate success, at 425, before ending. Indicating success at this stage may include creating a log entry that indicates the data was copied from the secondary source data object.

When the secondary source indicator is not available (no at 430), this indicates that neither the primary source data object, nor the secondary source data object is available for copying. This suggests that neither data object exists or is available. As a result, the copying operation may not be completed. Method 400 may thus proceed to indicate failure, at 445. Indicating failure may include creating a log entry in the log file that specifies neither the primary nor the secondary data object was available and/or the copying process failed. In some implementations, indicating success or failure may include transmitting a notification to the user who submitted the copying request.

Figure 5:
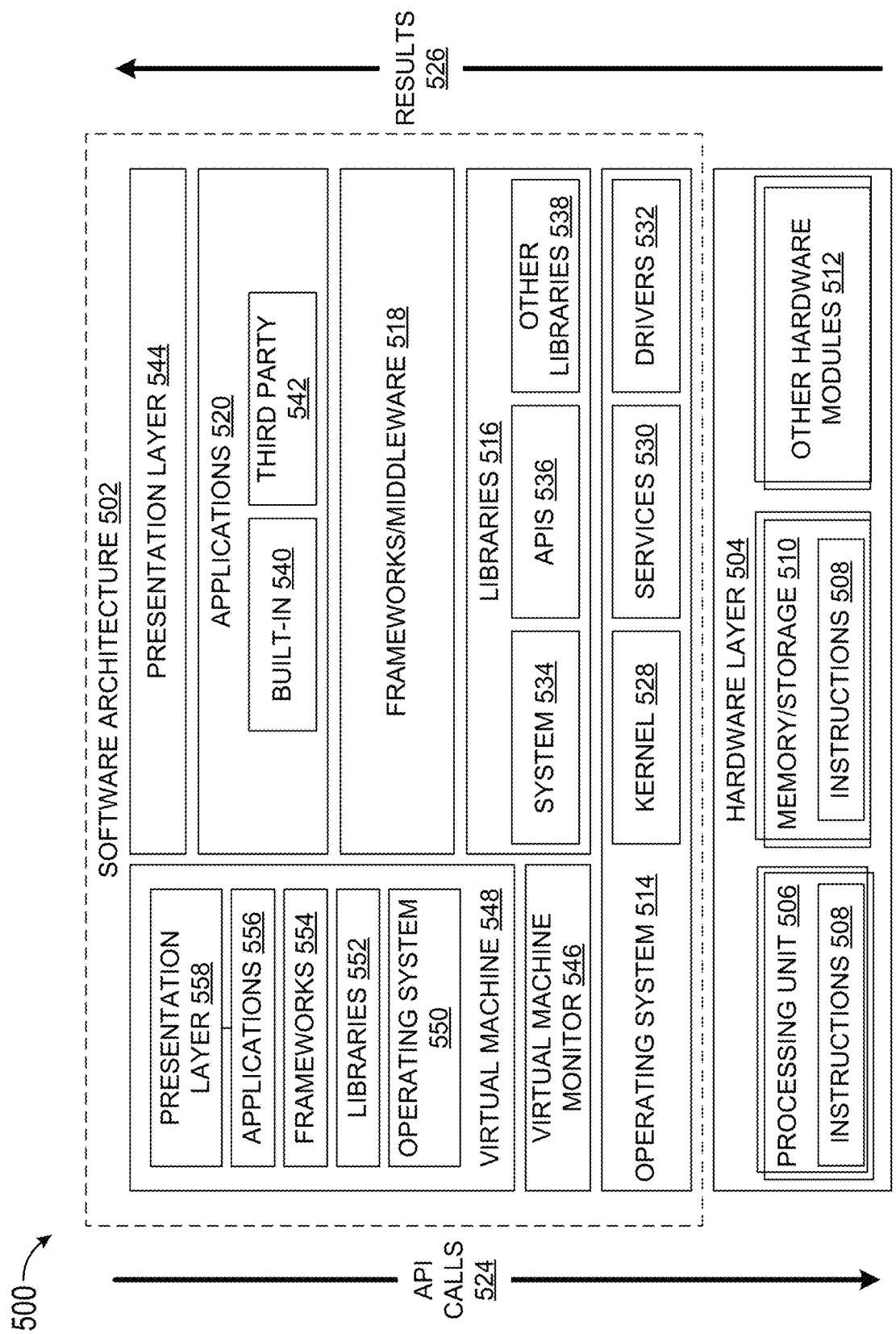
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
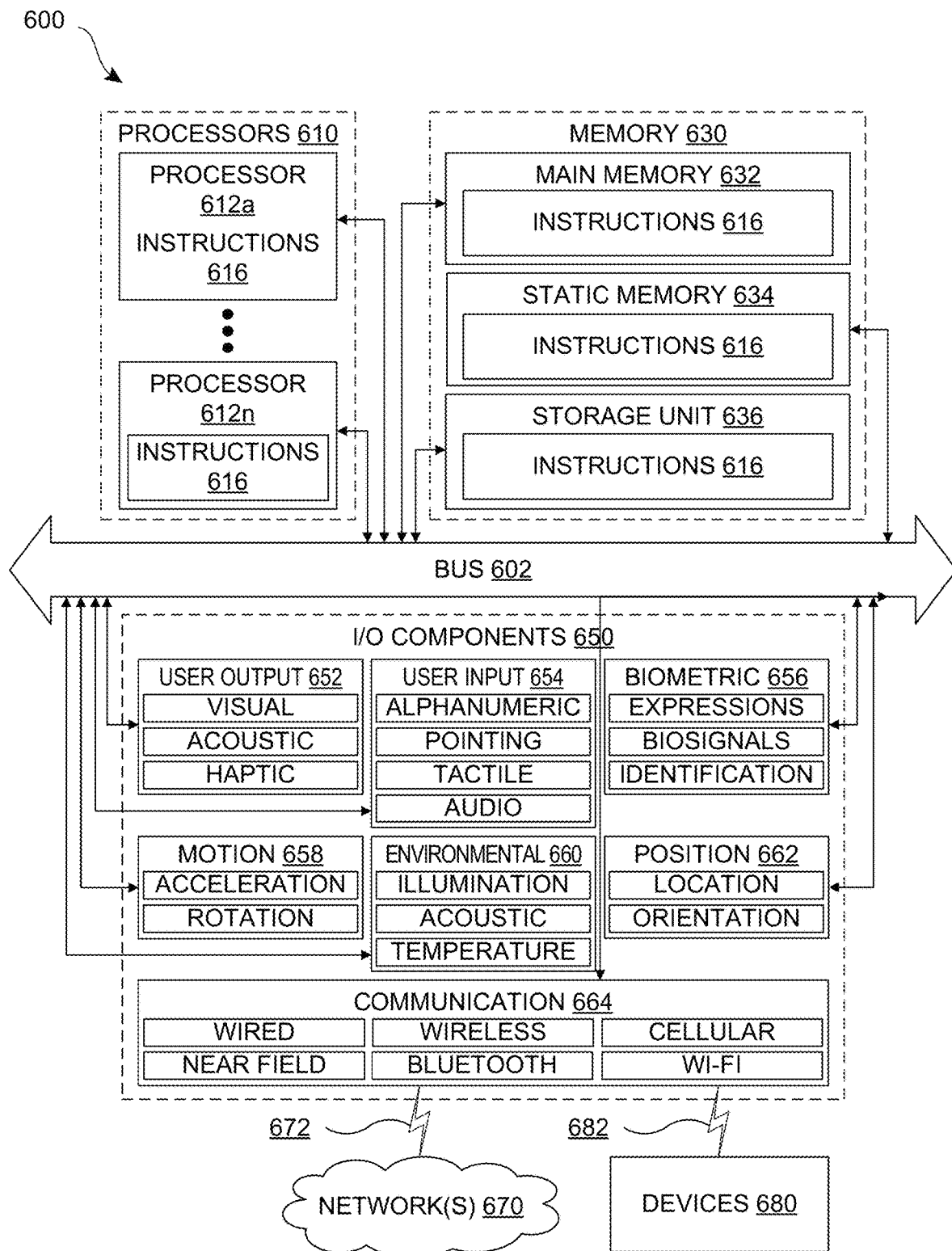
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by the processor, cause the data processing system to perform functions of:
 receiving a request to copy a data object in a data environment to a destination source, the request including an identification of a first source data object, a second source data object and indication of an order of preference between the first data object and the second data object for copying the data object, the first source data object and the second source data object containing the data object and the first source data object and the second source data object being active-active data objects that are replicas of each other;
 determining based on the order that the data object should be copied from the first source data object, when the first source data object is available;
 examining a first source indicator to determine if the first source data object is available for copying, and if so, copying the data object from the first source data object to the destination source;
 upon determining that the first source data object is not available for copying, determining whether the second source data object is available for copying, and, if so, copying the data object from the second source data object to the destination source; and
 upon copying the data object to the destination source, creating an indication of successful copying of the data object to the destination source.

Item 2. The data processing system of item 1, wherein the request includes an identification of the first source indicator and an identification of a second source indicator.

Item 3. The data processing system of any items 1 or 2, wherein the memory further stores executable instructions that, when executed by the processor, cause the data processing system to perform a function of:
 upon copying the data object from the first source data object to the destination source, copying the first source indicator to the destination source, and
 if the data object is copied from the second source data object to the destination source, copying the second source indicator to the destination source.

Item 4. The data processing system of any preceding item, wherein providing the data object in the first source data object and the second source data object prevents a copying operation failure when the first data object is not available.

Item 5. The data processing system of any preceding item, wherein the identification of the second source data object in the request enables compliance with service-level agreements regarding availability of the data object, when the first source data object is not available.

Item 6. The data processing system of any preceding item wherein creating an indication of successful copying of the data object to the destination source includes creating an entry indicating success in a log file.

Item 7. The data processing system of any preceding item, wherein by providing the order of preference in the request, a need for duplicate copying from both the first data object and the second data object to prevent a copying operation failure is eliminated.

Item 8. The data processing system of any preceding item, wherein the request is received via a JSON file.

Item 9. The data processing system of item 8, wherein the JSON file includes an identification for a conditional copying template used to perform conditional copying of the data object.

Item 10. A method for performing conditional copying of a data object in a data environment to prevent a copying operation failure comprising:
- receiving a request to copy a data object in a data environment to a destination source, the request including an identification of a first source data object, a second source data object and indication of an order of preference between the first data object and the second data object for copying the data object, the first source data object and the second source data object containing the data object and the first source data object and the second source data object being active-active data objects that are replicas of each other;
- determining based on the order that the data object should be copied from the first source data object, when the first source data object is available;
- examining a first source indicator to determine if the first source data object is available for copying or if the first source data object is not available for copying;
- based on the determination, copying the data object from the first source data object to the destination source, when the first source data object is available for copying and copying the copying the data object from the second source data object to the destination source, when the first source data object is not available for copying; and
- upon copying the data object to the destination source, creating an indication of successful copying of the data object to the destination source.

Item 11. The method of item 10, wherein the request includes an identification of the first source indicator and an identification of a second source indicator.

Item 12. The method of any of items 11 or 12, wherein providing the data object in the first source data object and the second source data object prevents a copying operation failure when the first data object is not available.

Item 13. The method of any of items 10-12, wherein creating an indication of successful copying of the data object to the destination source includes creating an entry indicating success in a log file.

Item 14. The method of any of items 10-13, wherein the identification of the second source data object in the request enables compliance with service-level agreements regarding availability of the data object, when the first source data object is not available.

Item 15. The method of any of items 10-14, wherein by providing the order of preference in the request, a need for duplicate copying from both the first data object and the second data object to prevent a copying operation failure is eliminated.

Item 16. A non-transitory computer readable medium on which are stored instructions that when executed cause a programmable device to perform functions of:
- receiving a request to copy a data object in a data environment to a destination source, the request including an identification of a first source data object, a second source data object and indication of an order of preference between the first data object and the second data object for copying the data object, the first source data object and the second source data object containing the data object and the first source data object and the second source data object being active-active data objects that are replicas of each other;
- determining based on the order that the data object should be copied from the first source data object, when the first source data object is available;
- examining a first source indicator to determine if the first source data object is available for copying, and if so, copying the data object from the first source data object to the destination source;
- upon determining that the first source data object is not available for copying, determining whether the second source data object is available for copying, and, if so, copying the data object from the second source data object to the destination source; and
- upon copying the data object to the destination source, creating an indication of successful copying of the data object to the destination source.

Item 17. The non-transitory computer readable medium of item 16, wherein the request includes an identification of the first source indicator and an identification of a second source indicator.

Item 18. The non-transitory computer readable medium of any of items 16 or 17, wherein the instructions further cause the programmable device to perform functions of upon copying the data object to the destination source, copying the first source indicator to the destination source.

Item 19. The non-transitory computer readable medium of any of items 16-18, wherein the identification of the second source data object in the request enables compliance with service-level agreements regarding availability of the data object, when the first source data object is not available.

Item 20. The non-transitory computer readable medium of any of items 16-19, wherein the request is received via a JSON file and the JSON file includes an identification for a conditional copying template used to perform conditional copying of the data object.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request from a client device at a copying service to copy a data object in a data environment to a destination source, the request including an identification of a first source data object, a second source data object and indication of an order of preference between the first source data object and the second source data object for copying the data object, the first source data object and the second source data object containing the data object and the first source data object and the second source data object being active-active data objects that are replicas of each other;
determining, via a software module of the copying service, based on the order of preference, that the data object should be copied from the first source data object, when the first source data object is available;
determining if a first source indicator file is available from a location identified in the request to determine if the first source data object is available for copying, and if so, copying the data object from the first source data object to the destination source;
upon determining that the first source data object is not available for copying, determining, via the software module of the copying service, whether the second source data object is available for copying, and, if so, copying the data object from the second source data object to the destination source;
upon copying the data object to the destination source, creating an indication of successful copying of the data object to the destination source; and
upon copying the data object from the first source data object to the destination source, copying the first source indicator to the destination source.

2. The data processing system of claim 1, wherein the request includes an identification of the first source indicator and an identification of a second source indicator.

3. The data processing system of claim 1, wherein the memory further stores executable instructions that, when executed by the processor, cause the data processing system to perform a function of:
if the data object is copied from the second source data object to the destination source, copying the second source indicator to the destination source.

4. The data processing system of claim 1, wherein providing the data object in the first source data object and the second source data object prevents a copying operation failure when the first data object is not available.

5. The data processing system of claim 1, wherein the identification of the second source data object in the request enables compliance with service-level agreements regarding availability of the data object, when the first source data object is not available.

6. The data processing system of claim 1, wherein creating an indication of successful copying of the data object to the destination source includes creating an entry indicating success in a log file.

7. The data processing system of claim 1, wherein by providing the order of preference in the request, a need for duplicate copying from both the first data object and the second data object to prevent a copying operation failure is eliminated.

8. The data processing system of claim 1, wherein the request is received via a JavaScript Object Notation (JSON) file.

9. The data processing system of claim 8, wherein the JSON file includes an identification for a conditional copying template used to perform conditional copying of the data object.

10. A method for performing conditional copying of a data object in a data environment to prevent a copying operation failure comprising:
receiving a request to copy a data object in a data environment to a destination source, the request including an identification of a first source data object, a second source data object and indication of an order of preference between the first source data object and the second source data object for copying the data object, the first source data object and the second source data object containing the data object and the first source data object and the second source data object being active-active data objects that are replicas of each other;
determining, via a software module of a copying service, based on the order of preference, that the data object should be copied from the first source data object, when the first source data object is available;
determining if a first source indicator file is available from a location identified in the request to determine if the first source data object is available for copying or if the first source data object is not available for copying;

based on the determination, copying the data object from the first source data object to the destination source, when the first source data object is available for copying and copying the data object from the second source data object to the destination source, when the first source data object is not available for copying;

upon copying the data object to the destination source, creating an indication of successful copying of the data object to the destination source; and upon copying the data object from the first source data object to the destination source, copying the first source indicator to the destination source.

11. The method of claim 10, wherein the request includes an identification of the first source indicator and an identification of a second source indicator.

12. The method of claim 10, wherein providing the data object in the first source data object and the second source data object prevents a copying operation failure when the first data object is not available.

13. The method of claim 10, wherein creating an indication of successful copying of the data object to the destination source includes creating an entry indicating success in a log file.

14. The method of claim 10, wherein the identification of the second source data object in the request enables compliance with service-level agreements regarding availability of the data object, when the first source data object is not available.

15. The method of claim 10, wherein by providing the order of preference in the request, a need for duplicate copying from both the first data object and the second data object to prevent a copying operation failure is eliminated.

16. A non-transitory computer readable medium on which are stored instructions that when executed cause a programmable device to perform functions of:

receiving a request to copy a data object in a data environment to a destination source, the request including an identification of a first source data object, a second source data object and indication of an order of preference between the first data source object and the second source data object for copying the data object, the first source data object and the second source data object containing the data object and the first source data object and the second source data object being active-active data objects that are replicas of each other;

determining, via a software module of a copying service, based on the order of preference, that the data object should be copied from the first source data object, when the first source data object is available;

examining a first source indicator to determine, via the software module of the copying service, if the first source data object is available for copying, and if so, copying the data object from the first source data object to the destination source;

upon determining that the first source data object is not available for copying, determining whether the second source data object is available for copying, and, if so, copying the data object from the second source data object to the destination source;

upon copying the data object to the destination source, creating an indication of successful copying of the data object to the destination source; and upon copying the data object from first source data object to the destination source, copying the first source indicator to the destination source.

17. The non-transitory computer readable medium of claim 16, wherein the request includes an identification of the first source indicator and an identification of a second source indicator.

18. The non-transitory computer readable medium of claim 16, wherein the instructions further cause the programmable device to perform functions of upon copying the second source data object to the destination source, copying the second source indicator to the destination source.

19. The non-transitory computer readable medium of claim 16, wherein the identification of the second source data object in the request enables compliance with service-level agreements regarding availability of the data object, when the first source data object is not available.

20. The non-transitory computer readable medium of claim 16, wherein the request is received via a JavaScript Object Notation (JSON) file and the JSON file includes an identification for a conditional copying template used to perform conditional copying of the data object.

* * * * *